Sept. 19, 1939.    H. L. SONDERUP    2,173,598
JACK AND CARRIAGE THEREFOR
Filed Jan. 28, 1939

Inventor
H. L. Sonderup
By Arthur H. Sturges
Attorney

Patented Sept. 19, 1939

2,173,598

UNITED STATES PATENT OFFICE 2,173,598

JACK AND CARRIAGE THEREFOR

Hans L. Sonderup, St. Paul, Nebr.

Application January 28, 1939, Serial No. 253,289

4 Claims. (Cl. 254—1)

This invention relates to jacks and more particularly to hydraulic vehicle jacks and carriages therefor.

It is a primary object of the invention to provide a mechanism for operating a hydraulic jack from a comparatively remote distance and particularly from the rear of a vehicle having an elongated portion which extends rearwardly of the rear wheels thereof.

Another object of the invention is to provide a jack mechanism for the above stated purposes which can be readily taken apart for compact storage and placed together for use, said mechanism to be comprised of few and simple parts.

Other and further objects and advantages of the invention will be understood from the following detailed description thereof.

In the drawing Figure 1 is a side elevation of the rear end of a fragment of an automobile, certain parts thereof being broken away and in section and showing the new jack mechanism assembled and applied thereto in a position of use.

Figure 1:
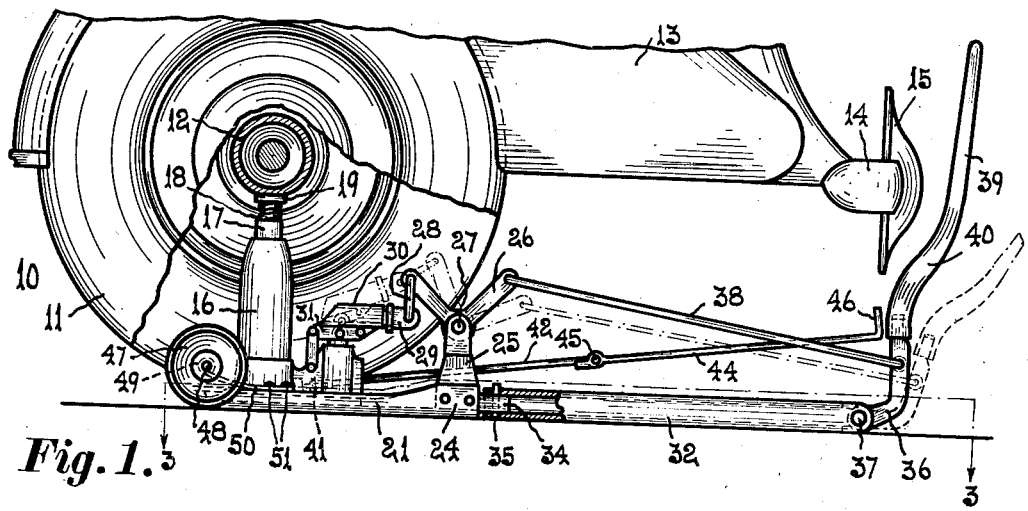

Resultant from the new modern types of automobiles, the latter are provided with a compartment at the rear end thereof whereby a portion of the body of the vehicle overhangs and extends rearwardly of the rear axle an appreciably greater distance than heretofore whereby in order for a motorist to place a jack under the rear axle of his vehicle for changing tires or the like it has occasioned the soiling of his clothing in order to properly position his jack while crawling under the vehicle and like undesirable practices. In order to overcome this difficulty jacks have been provided which apply to the rear bumper of an automobile thereby necessitating an elevation of the body of the vehicle away from the ground a comparatively great distance in order that the springs under the frame of the vehicle become first bowed upwardly before the rear axle and a rear wheel can become elevated sufficiently to change a tire and the present invention contemplates the provision of means for obviating undesirable prior practices.

Referring now to the drawing for a more particular description in which like numerals of reference designate like or corresponding parts throughout the several views, 10 indicates generally a motor vehicle having a rear tire 11 which supports one end of a rear axle housing 12. The body of the vehicle includes a trunk compartment 13 which extends rearwardly of the axle housing 12 an appreciable distance. At the rear end of the compartment 13 a bumper bar 14 is provided and vertically disposed guards 15 are carried by the bumper bar 14 whereby the distance from the guards 15 to the rear axle housing 12 varies in the several makes of automobiles from 3 to 4 feet, said distance being such that it is exceedingly inconvenient to place a jack under said rear axle and operate the jack for raising said axle and tire 11.

The present invention includes a hydraulic jack 16 which may be of any desired conventional type whereby it is believed that the jack requires no particular description herein. The jack 16 is such as or similar to any of those jacks depicted on page 638 of the spring and summer catalogue of Sears, Roebuck and Co.

The jack includes a cylinder having a piston therein and a quantity of oil, suitable check valves and a pump mechanism whereby at times when a lever is reciprocated the oil becomes forced against the piston for elevating the vertical slidable upper end part 17 of the jack all in a well known manner. The part 17 receives a threaded shaft 18, the latter being provided at its upper end with a foot 19 having a rugose surface for engagement with the rear axle housing 12. Prior to use the shaft 18 is rotated for making a rough adjustment as to the height of the foot 19 in a well known manner.

Figure 4:
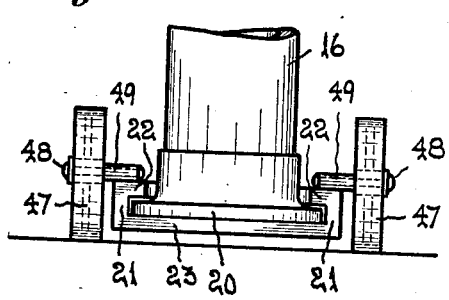
Figure 4 is a front elevation of a portion of the jack mechanism.
Figure 5:
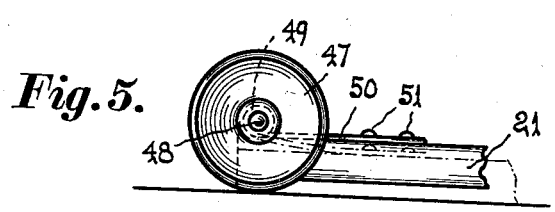
Figure 5 is a side elevation of the said portion shown in Figure 4.

As best shown in Figure 4, the cylinder is provided with a base 20 which includes a perimetrically disposed flange. Oppositely disposed edges of the flange of the base 20 are adapted to be slidingly received between the side rails 21 of the jack carriage. The upper edges of the rails 21 are each provided with an inwardly turned flange 22 which engages over the flange of the jack for preventing the jack from tipping in any direction with respect to the carriage. The base of the carriage is indicated at 23 and it will be understood that as thus described the jack 16 rests upon said base 23 and is operatively secured thereto and prevented from movement with respect to the base in all directions except that the jack can be detached, if desired, from the carriage by sliding it in one direction with respect to the carriage and upon the base 23 for compact storage purposes.

Figure 2:
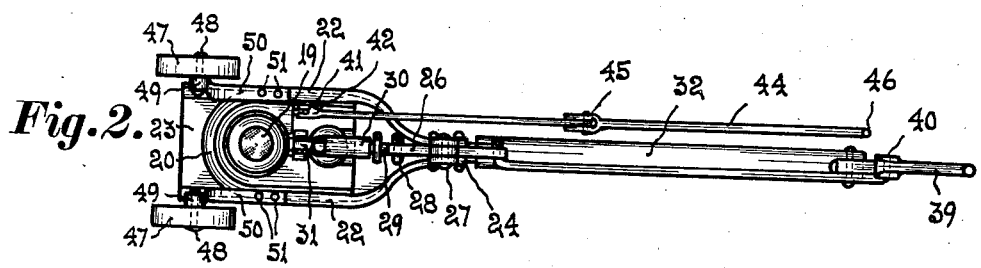
Figure 2 is a top plan view of the jack.
Figure 3:
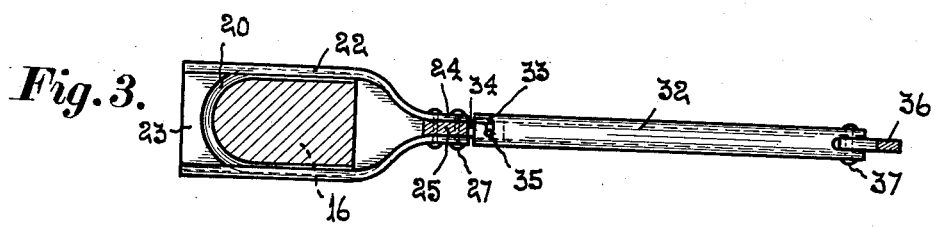
Figure 3 is a sectional view of said jack taken on line 3—3 of Figure 1.

The base 23 of the carriage is comparatively wide and long for supporting the jack 16 thereby eliminating the necessity of placing a board under the jack as conventionally employed at times when the roadway is comprised of soft earth. The rearwardly disposed portions of the side rails and flanges of the carriage taper towards each other as best shown in Figures 2 and 3 and preferably terminate in oppositely disposed ears 24 between and to which a vertically disposed standard 25 is secured by any suitable means such as rivets, welding or the like. The upper end of the standard 25 is bifurcated and the fulcrum corner of a bell-crank-lever 26 is pivotally mounted thereon as at 27. The forwardly disposed arm of the bell-crank 26 is pivotally attached to a link 28 at one of the ends of the latter, the other end of the link being pivotally attached to a pin 29. The pin 29 is received in the rocker-socket 30 of the jack 16, said socket being formed integral with a toggle-link or rocker-arm 31 which is pivotally attached to the exterior end of the shaft of the pump mechanism of the jack. A conventional hydraulic jack is provided with a lever, one end of which is received in the socket 30 and by reciprocating said lever in a vertical direction fluid is pumped within the jack for elevating the foot 19.

Obviously if that arm of the bell-crank 26 which is disposed furthest from the link 28 be reciprocated the foot 19 will become correspondingly elevated and the invention further includes means for reciprocating said bell-crank.

The base of the carriage 23 is provided with a detachable extension 32 which is preferably in the form of an elongated tube, being preferably rolled of sheet metal. The forward end of the tube 32 is provided with a slot 33 of L-shape in plan, as best shown in Figure 3, said forward end being adapted to telescopically encircle a rearwardly projecting stub portion 34 of the casting or standard 25. The stub is provided with a pin detent 35 whereby in order to attach the tube to the carriage base, the tube is engaged about said stub portion and at this time that portion of the L-shaped slot which is longitudinally disposed with respect to the tube is placed in alignment with the pin 33 and the tube shoved towards the base of the carriage until the forward end of the tube abuts the standard 25; whereupon the tube is turned for causing the standard 25 to be disposed in the slot 33 for removably locking the tube to said carriage base. The tube 32 is long enough to extend to or past the rear bumper 14 of the vehicle and is provided with a bifurcated rear end to which a stub-lever 36 is pivotally secured as at 37. The stub-lever 36 is preferably provided with an offset portion whereby it is adapted to fold against the tube 32 for compact storage purposes. A push-pull rod 38 is pivotally connected at its opposite ends to and between the stub-lever 36 and the bell-crank 26, respectively, as shown in Figure 1, and it will be understood that said rod 38 may be disengaged at times when desired from the members 36 and 26 for storage purposes. As thus described it will be understood that at times when the stub-lever 36 is reciprocated a corresponding motion is applied to the bell-crank 26 through the rod 38 for operating the hydraulic jack for elevating the foot 19 thereof.

In order to provide leverage for reciprocating the stub-lever 36 an elongated rock-lever 39 therefor is provided. The wider and lower end of the rock-lever 39 is provided with an elongated slot which is adapted to receive the upper end of the stub-lever 36, the latter being of a corresponding shape whereby the rock-lever 39 may be readily removed from or attached to the stub-lever and the latter is preferably provided with an offset portion 40 whereby the main body portion of the rock-lever 39 will not strike the rear bumper 14 at times when said rock-lever is in use. The rock-lever 39 tapers from said offset portion upwardly to its thinner, narrower end, said end being preferably comparatively thin for saving weight and an excess of metal since strength is not required proportionally at said upper terminal end.

The jack is provided with a release by-pass valve operable by a rotatable key 41 in a well-known manner and at times when said key is rotated in one direction the valve is thereby closed for preventing a passage of oil through said by-pass, the latter being closed at times when fluid is being pumped for elevating the vehicle axle and wheel.

At times when it is desired that the foot 19 be lowered the weight of the vehicle is sufficient for said purpose at times when the key 41 of said by-pass valve is open and for this purpose the key 41 is rotated in a direction opposite to the first mentioned direction in a well known manner. In order to provide means for operating the key 41 from a remote distance a rod 42 is provided, the forward end of which is bifurcated as at 43 for engaging the key 41. The rod 42 is preferably of two-piece construction having a portion 44 which is pivotally attached to the rod 42 as at 45, the construction being such that the portion 44 may be folded against the main body portion thereof for compact storage. The rear end of said portion 44 is provided with an operating handle 46 which the operator may grasp for turning the key 41 of said release valve.

In operation the several parts of the device are assembled as above described; whereupon the operator may grasp the rock-lever 39 for positioning the foot 19 under the rear axle housing. Since it requires a trial or two before the foot 19 becomes positioned accurately under the rear axle resultant from the fact that the operator often cannot see under the vehicle, means are provided for facilitating a movement of the device about and under the said axle housing, said device preferably including certain later described anti-friction rollers.

As specifically shown the means for facilitating movements of the forward end of the mechanism under and about the vehicle includes oppositely disposed wheels 47 which are each mounted on a stub axle 48, as shown in Figure 4. The stub axles are carried in bearing eyes 49 provided in the forward ends of leaf springs 50, the latter being riveted, welded or otherwise suitably secured as at 51 to the upper surfaces of the flanges 22 of the side rails 21 of the carriage adjacent the forward end thereof. The leaf springs 50 are comparatively thin and are of sufficient resiliency to urge the forward end of the carriage off from the ground, as shown in Figure 4, at times when the weight of the vehicle 10 is not upon the foot 19, whereby the jack may be conveniently moved about and the weight thereof carried upon said wheels. At times when the weight of the vehicle is upon the foot 19 said weight overcomes the resistance of the leaf springs 50 and the latter then assume the position and shape thereof shown in Figure 1, the bottom surface of the base of the carriage at this time resting upon the ground for supporting the weight of the vehicle.

As thus described it will be understood that the carriage portion for the mechanism may be manufactured and sold separately for use by motorists who are already in possession of a hydraulic jack and that in order to save manufacturing costs and, if so desired, that a jack mechanism such as is contained in the jack 16 may be manufactured in a manner whereby the base 20 is formed integral with the base 23 of the carriage, the said integral construction being particularly intended for use by those who do not desire a compactly foldable mechanism with respect to all of the parts thereof.

From the foregoing description it is thought to be obvious that a jack constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice, except as claimed.

I claim:

1. A carriage device for operating a hydraulic jack having a rocker-socket and a perimetrically disposed flange adjacent the bottom thereof, comprising a base having side rails adapted to engage said flange for removably securing said jack to said carriage at one end of the latter, a bell-crank having arms disposed in alignment with said jack pivotally connected to the other end of said base, a pin adapted to engage in said socket, a link having opposite ends respectively pivotally connected to said pin and an arm of said bell-crank, whereby movement of the other arm of said bell-crank is adapted to cause a corresponding movement of said rocker-socket for actuating the mechanism of said jack, and means for reciprocating said other arm comprising an elongated member adapted to be removably attached at one of its ends to said base in approximate alignment with said bell-crank and jack, a stub-lever pivotally connected to the other end of said member, a push-pull-rod having opposite ends respectively pivotally and removably connected to and between said stub-lever and said other arm, and an elongated rock-lever adapted to be removably connected to said stub-lever.

2. A carriage device for operating a hydraulic jack having a rocker-socket, comprising an elongated base, means carried by said base for operatively attaching said jack to one end thereof, a rock-lever pivotally attached to the other end of said base, a bell-crank lever pivotally mounted on said base between said ends, a push-pull rod having ends respectively pivotally connected to one arm of said bell-crank and said rock-lever, a link having an end pivotally connected to the other arm of said bell-crank, and a pin pivotally connected to the other end of said link, said pin being adapted to engage in said socket for causing corresponding movements of said rock-lever to be applied to said rocker-socket for actuating the mechanism of said jack.

3. A jack for elevating the rear axle housing of a vehicle having, in combination with the rocker-arm of the pump-shaft of a hydraulic jack-mechanism, of means for operating said pump rearwardly of said vehicle, said means comprising a carriage for said jack having a length approximately equal to the distance between said housing and the rear end of said vehicle, said arm being disposed adjacent one end of said carriage, a lever pivotally attached to the other end of said carriage, and a reciprocatable connection between said lever and said arm for causing movements of said lever to be correspondingly applied to said shaft.

4. The combination with a hydraulic jack having a rocker-arm pivotally attached to the shaft of the pump mechanism thereof, of an elongated base for supporting said jack at one end thereof, a rock-lever pivotally attached to the other end of said base, and means for causing movements of said lever to be correspondingly applied to said arm for actuating said shaft and pump mechanism.

HANS L. SONDERUP.